United States Patent

Aoyama et al.

(10) Patent No.: US 10,500,943 B2
(45) Date of Patent: Dec. 10, 2019

(54) GRILL SHUTTER DEVICE

(71) Applicant: TOYOTA JIDOSHA KABUSHIKI KAISHA, Toyota-shi, Aichi-ken (JP)

(72) Inventors: Hitoshi Aoyama, Miyoshi (JP); Masayuki Kitashiba, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/120,838

(22) Filed: Sep. 4, 2018

(65) Prior Publication Data

US 2019/0143805 A1    May 16, 2019

(30) Foreign Application Priority Data

Nov. 14, 2017   (JP) .................................. 2017-219333

(51) Int. Cl.
    *B60K 11/08* (2006.01)
    *B60K 11/06* (2006.01)

(52) U.S. Cl.
    CPC ............ *B60K 11/085* (2013.01); *B60K 11/06* (2013.01)

(58) Field of Classification Search
    CPC .............................................. B60K 11/06–085
    See application file for complete search history.

(56) References Cited

U.S. PATENT DOCUMENTS

| 8,302,714 | B2 * | 11/2012 | Charnesky | B60K 11/085 |
| | | | | 180/68.1 |
| 2006/0102399 | A1 * | 5/2006 | Guilfoyle | B60K 11/04 |
| | | | | 180/68.1 |
| 2009/0266312 | A1 * | 10/2009 | Preiss | B60K 11/04 |
| | | | | 123/41.05 |
| 2010/0147611 | A1 * | 6/2010 | Amano | B60K 6/365 |
| | | | | 180/68.1 |
| 2012/0110909 | A1 * | 5/2012 | Crane | B60K 11/085 |
| | | | | 49/70 |
| 2013/0110356 | A1 * | 5/2013 | Konishi | B60K 11/085 |
| | | | | 701/49 |
| 2013/0126253 | A1 * | 5/2013 | Saito | B60K 11/085 |
| | | | | 180/68.1 |
| 2013/0184943 | A1 * | 7/2013 | Sato | B60H 1/00978 |
| | | | | 701/49 |

(Continued)

FOREIGN PATENT DOCUMENTS

| EP | 2479054 A1 | 7/2012 |
| JP | 2012-148705 A | 8/2012 |
| JP | 2014-069788 A | 4/2014 |

*Primary Examiner* — Erez Gurari
(74) *Attorney, Agent, or Firm* — Oliff PLC

(57) ABSTRACT

A grill shutter device includes an opening portion positioned in a vehicle front portion, a fin configured to open and close the opening portion, and a frame configured to hold the fin. The frame has an inner frame and an outer frame. The inner frame has a rear side air introduction port open toward the cooling object device. The outer frame has a front side air introduction port positioned in front of the inner frame and open toward the rear side air introduction port at a position corresponding to the opening portion. The inner frame has a first wall portion covering the fin from a vehicle rear side in an open state where the fin opens the opening portion. The outer frame has a second wall portion covering the fin from the vehicle front side in the open state where the fin opens the opening portion.

6 Claims, 5 Drawing Sheets

(56) References Cited

U.S. PATENT DOCUMENTS

| | | | | |
|---|---|---|---|---|
| 2013/0248265 A1* | 9/2013 | Wolf | ................... | B60K 11/085 |
| | | | | 180/68.1 |
| 2013/0268164 A1* | 10/2013 | Sugiyama | ............ | B60K 11/085 |
| | | | | 701/49 |
| 2014/0196965 A1* | 7/2014 | Platto | ................... | B60K 11/085 |
| | | | | 180/68.1 |
| 2016/0089971 A1* | 3/2016 | Asai | ................... | B60K 11/085 |
| | | | | 269/193.1 |
| 2016/0230820 A1* | 8/2016 | Matthews | ........... | F16D 43/2024 |
| 2016/0236563 A1* | 8/2016 | Ruppert | ............... | B60K 11/085 |
| 2017/0050509 A1* | 2/2017 | Aizawa | ............... | B60K 11/085 |
| 2017/0129324 A1* | 5/2017 | Kaneko | ................. | B60K 11/04 |
| 2017/0137073 A1* | 5/2017 | Huber | .................. | B62D 35/005 |
| 2017/0326967 A1* | 11/2017 | Brueckner | ................ | F01P 7/10 |
| 2017/0361699 A1* | 12/2017 | Wiech | ................. | B60K 11/085 |
| 2017/0361701 A1* | 12/2017 | Dunty | ................... | B60R 19/52 |
| 2018/0154764 A1* | 6/2018 | Uchida | .................. | B60R 19/48 |
| 2019/0061515 A1* | 2/2019 | Jeong | ................. | B60K 11/085 |
| 2019/0084409 A1* | 3/2019 | Komatsubara | ....... | B60K 11/085 |
| 2019/0101045 A1* | 4/2019 | Nishioka | .................. | F01P 7/10 |

\* cited by examiner

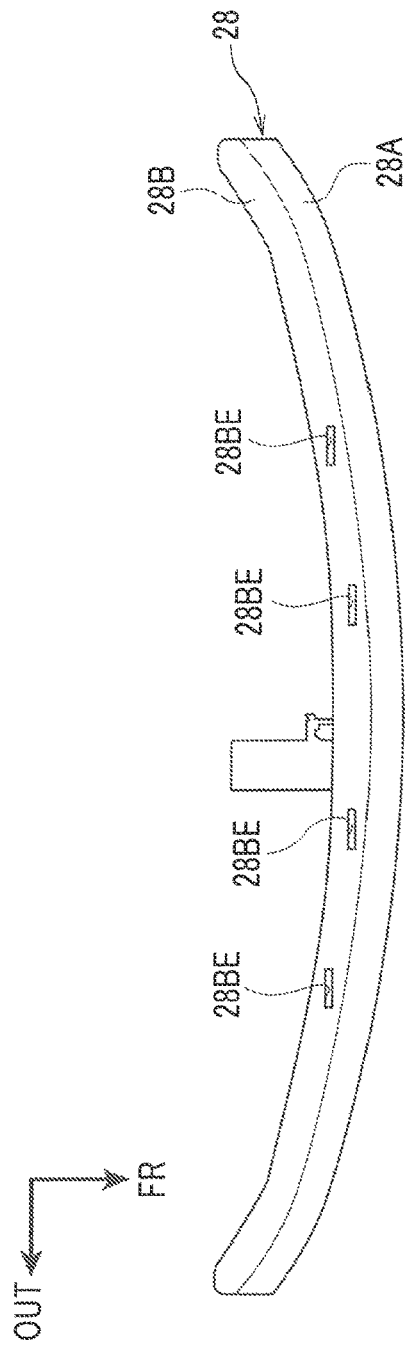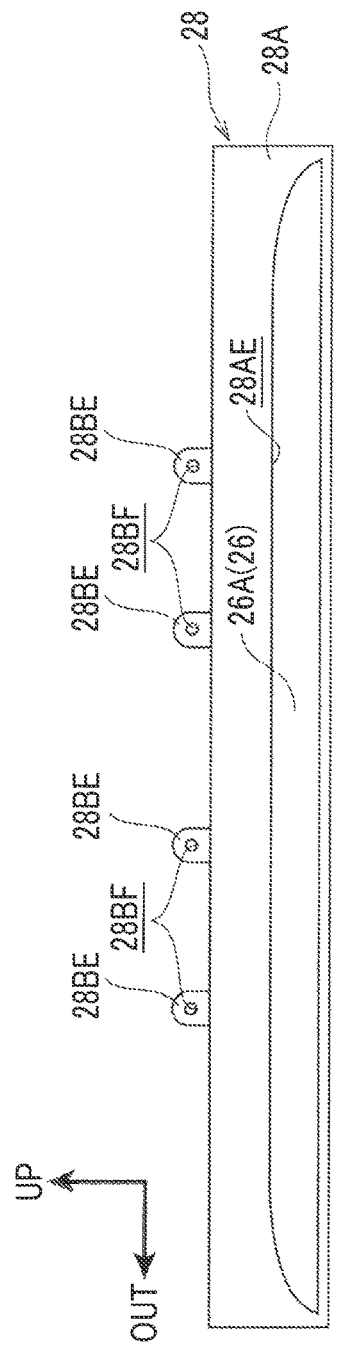

GRILL SHUTTER DEVICE

INCORPORATION BY REFERENCE

The disclosure of Japanese Patent Application No. 2017-219333 filed on Nov. 14, 2017 including the specification, drawings and abstract is incorporated herein by reference in its entirety.

BACKGROUND

1. Technical Field

The present disclosure relates to a grill shutter device.

2. Description of Related Art

Japanese Unexamined Patent Application Publication No. 2012-148705 (JP 2012-148705 A) discloses a grill shutter device. The grill shutter device has an opening portion disposed in a vehicle front portion and open in a vehicle front-rear direction, a cover opening and closing the opening portion, and a transmission mechanism moving the cover between an open state and a closed state. As a result of the above, the opening portion can be closed or opened depending on power unit operation situations or the like, and thus air can be appropriately taken in.

SUMMARY

Desirably, a guide member is disposed in the vicinity of the opening portion so that air taken in from the opening portion when the opening portion is open is guided to a cooling object device mounted in a vehicle. However, once the guide member is disposed in the vicinity of the opening portion in the grill shutter device disclosed in JP 2012-148705 A, the movement of the cover between the open state and the closed state is hindered. Conceivable in this regard is a guide member disposed at a position away from the movement trajectory of the cover. In this case, however, air taken in from the opening portion diffuses before reaching the guide member, and thus effective air supply to the cooling object, device may be impossible. The above-described related art leaves room for improvement in this regard.

The present disclosure provides a grill shutter device with which air can be effectively supplied to a cooling object device.

An aspect of the present disclosure relates to a grill shutter device. The grill shutter device includes an opening portion positioned at a part of a design surface of a vehicle front portion and positioned in the vehicle front portion on a vehicle front side of a cooling object device mounted in a vehicle, a fin configured to open and close the opening portion and having the same shape (in the present specification, "the same shape" also means "substantially the same shape") as the opening portion in front view of the vehicle and having a surface continuous with respect to the design surface in a closed state where the fin closes the opening portion, and a frame disposed between the opening portion and the cooling object device and configured to hold the fin. The frame has an inner frame and an outer frame. The inner frame has a rear side air introduction port open toward the cooling object device. The outer frame has a front side air introduction port positioned in front of the inner frame and open toward the rear side air introduction port at a position corresponding to the opening portion. The inner frame has a first wall portion covering the fin from a vehicle rear side in an open state where the fin opens the opening portion. The outer frame has a second wall portion covering the fin from the vehicle front side in the open state where the fin opens the opening portion.

According to the aspect of the present disclosure, the fin is disposed in the inner portion of the opening portion positioned at a part of the design surface of the vehicle front portion and in the vehicle front portion on the vehicle front side of the cooling object device mounted in the vehicle and the fin is configured to open and close the opening portion and has the same shape as the opening portion in front view of the vehicle in the closed state where the opening portion is closed. The fin is held by the frame disposed between the opening portion and the cooling object device and has the surface continuous with respect to the design surface in the closed state where the opening portion is closed. The frame is configured to include the inner frame covering the fin from the vehicle rear side and the outer frame disposed at a position facing the inner frame and covering at least the open state of the fin from the vehicle front side. The rear side air introduction port open toward the cooling object device is formed in the inner frame. In the outer frame, the front side air introduction port open toward the rear side air introduction port is formed at a position corresponding to the opening portion. Accordingly, in a case where the fin is in the open state during vehicle traveling, air is taken in from the opening portion and flows to the cooling object device through the front side air introduction port of the outer frame and the rear side air introduction port of the inner frame. In other words, the inner frame covering the fin from the vehicle rear side suppresses a flow of air to the vehicle rear side from a part other than the rear side air introduction port formed in the inner frame after the air passes through the opening portion and the front side air introduction port, and thus the air diffusing before reaching the cooling object device can be suppressed.

Here, the "cooling object device" includes a power unit such as an engine and a motor and a heat generation device such as a battery and a fuel cell as well as a cooling system device such as a radiator.

In the grill shutter device according to the aspect of the present disclosure, the outer frame may have an opening fitting portion fitted to an edge portion of the opening portion in an edge portion of the front side air introduction port.

According to the aspect of the present disclosure, the outer frame has the opening fitting portion fitted to the edge portion of the opening portion in the edge portion of the front side air introduction port, and thus the opening fitting portion can be positioned so to speak when the outer frame is attached to the opening portion. Accordingly, the amount of deviation with respect to the position of the front side air introduction port set in advance is reduced, and thus the gap between the fin and the opening portion can be reduced.

In the grill shutter device according to the aspect of the present disclosure, the frame may constitute a closed section in side view of the vehicle with the inner frame and the outer frame.

According to the aspect of the present disclosure, the inner frame and the outer frame constitute a closed section in side view of the vehicle, and thus air flowing in from the opening portion flows to the cooling object device from the rear side air introduction port of the inner frame in a state where outward leakage of the air from the space between the inner frame and the outer frame is suppressed. Accordingly, air diffusing before reaching the cooling object device after flowing in from the opening portion can be further suppressed.

In the grill shutter device according to the aspect of the present disclosure, the inner frame may have a rib formed in a lattice shape in front view of the vehicle in the rear side air introduction port.

According to the aspect of the present disclosure, the inner frame has the rib formed in a lattice shape in front view of the vehicle in the rear side air introduction port. Accordingly, the rib formed in a lattice shape is capable of suppressing further foreign matter intrusion when foreign matter such as pebbles intrudes from the opening portion with the fin in the open state.

In the grill shutter device according to the aspect of the present disclosure, the opening portion may have a projection portion close to at least one of a vehicle upper side end portion and a vehicle lower side end portion of the fin in the closed state.

According to the aspect of the present disclosure, the opening portion has the projection portion close to at least one of the vehicle upper side end portion and the vehicle lower side end portion of the fin in the closed state, and thus the gap between the fin in the closed state and the opening portion can be further reduced.

In the grill shutter device according to the aspect of the present disclosure, the rear side air introduction port may be disposed to face the cooling object device on the vehicle front side of the cooling object device.

According to the aspect of the present disclosure, the rear side air introduction port is disposed to face the cooling object device on the vehicle front side of the cooling object device. Accordingly, air flowing in from the opening portion is allowed to flow more reliably to the cooling object device via the front side air introduction port and the rear side air introduction port.

The grill shutter device according to the aspect of the present disclosure has an excellent effect in that air can be effectively supplied to the cooling object device.

In addition, the grill shutter device according to the aspect of the present disclosure has an excellent effect in that appearance quality can be improved.

The grill shutter device according to the aspect of the present disclosure has an excellent effect in that air can be further effectively supplied to the cooling object device.

In addition, the grill shutter device according to the aspect of the present disclosure has an excellent effect in that adverse effects attributable to foreign matter can be suppressed.

The grill shutter device according to the aspect of the present disclosure has an excellent effect in that appearance quality can be further improved.

In addition, the grill shutter device according to the aspect of the present disclosure has an excellent effect in that cooling performance can be further improved.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 3A is a plan view illustrating the grill shutter device;

FIG. 3B is a front view illustrating a state of being seen from a vehicle front surface side with respect to FIG. 3A;

DETAILED DESCRIPTION OF EMBODIMENTS

Figure 1:
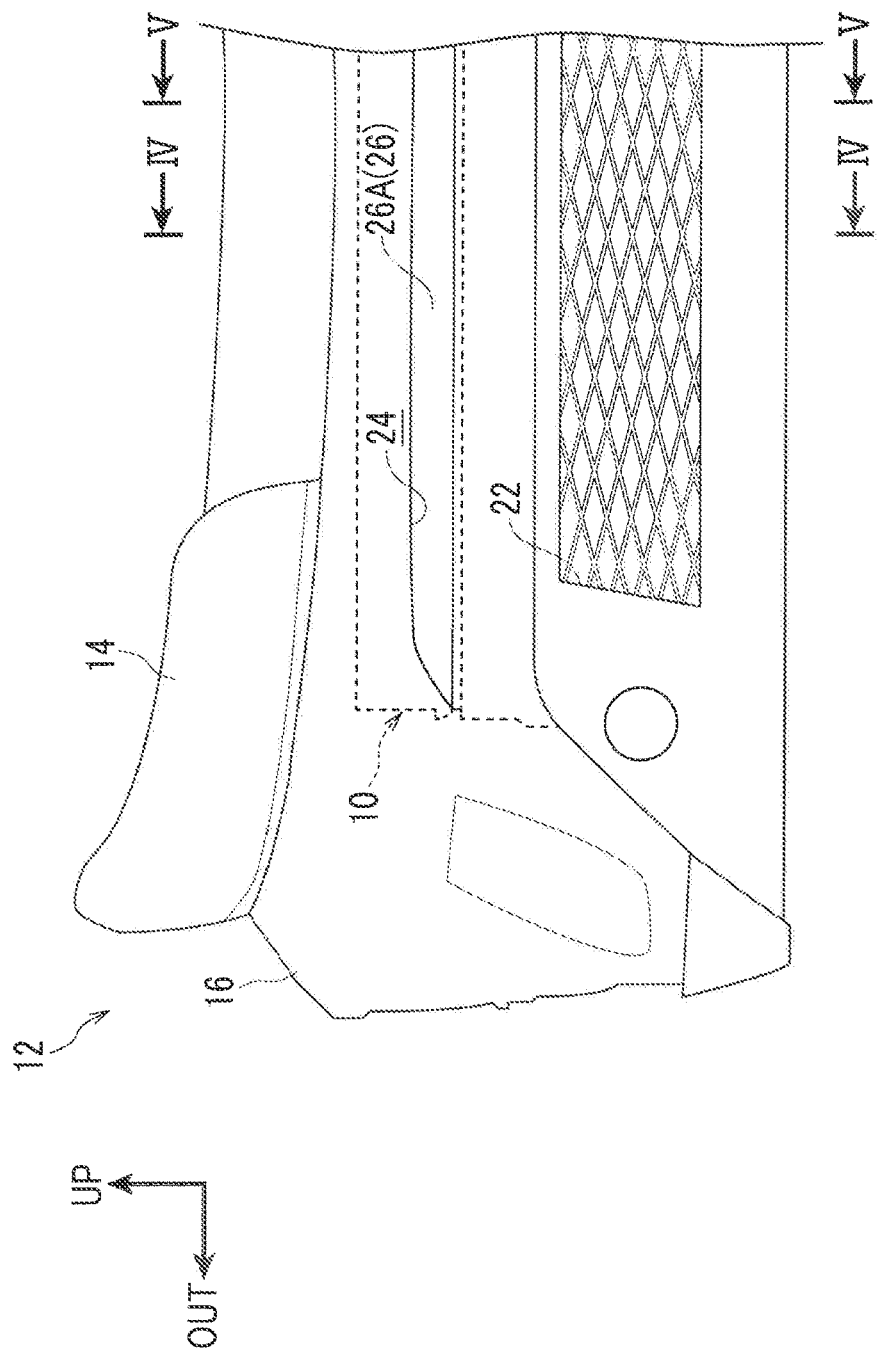
FIG. 1 is a front view illustrating a part of a vehicle that has a grill shutter device according to an embodiment.

Hereinafter, a grill shutter device 10 according to an embodiment of the present disclosure will be described with reference to FIGS. 1 to 5. The arrows FR, UP, and OUT appropriately shown in the drawings represent the forward direction (traveling direction) of a vehicle, the upward direction of the vehicle, and an outside in the width direction of the vehicle, respectively. Unless otherwise noted, the front and rear, the right and left, and the upper and lower sides in the following description refer to the front and rear in the front-rear direction of the vehicle, the right and left in the right-left direction of the vehicle (vehicle width direction), and the upper and lower sides in the up-down direction of the vehicle, respectively.

As illustrated in FIG. 1, the front portion of a vehicle 12 is configured to include a headlight 14, a power unit room 15 (refer to FIG. 4), and a front bumper cover 16. The headlight 14 is disposed in both end portions of the vehicle front portion in the vehicle width direction, and the headlights 14 are disposed separately from each other.

Figure 4:
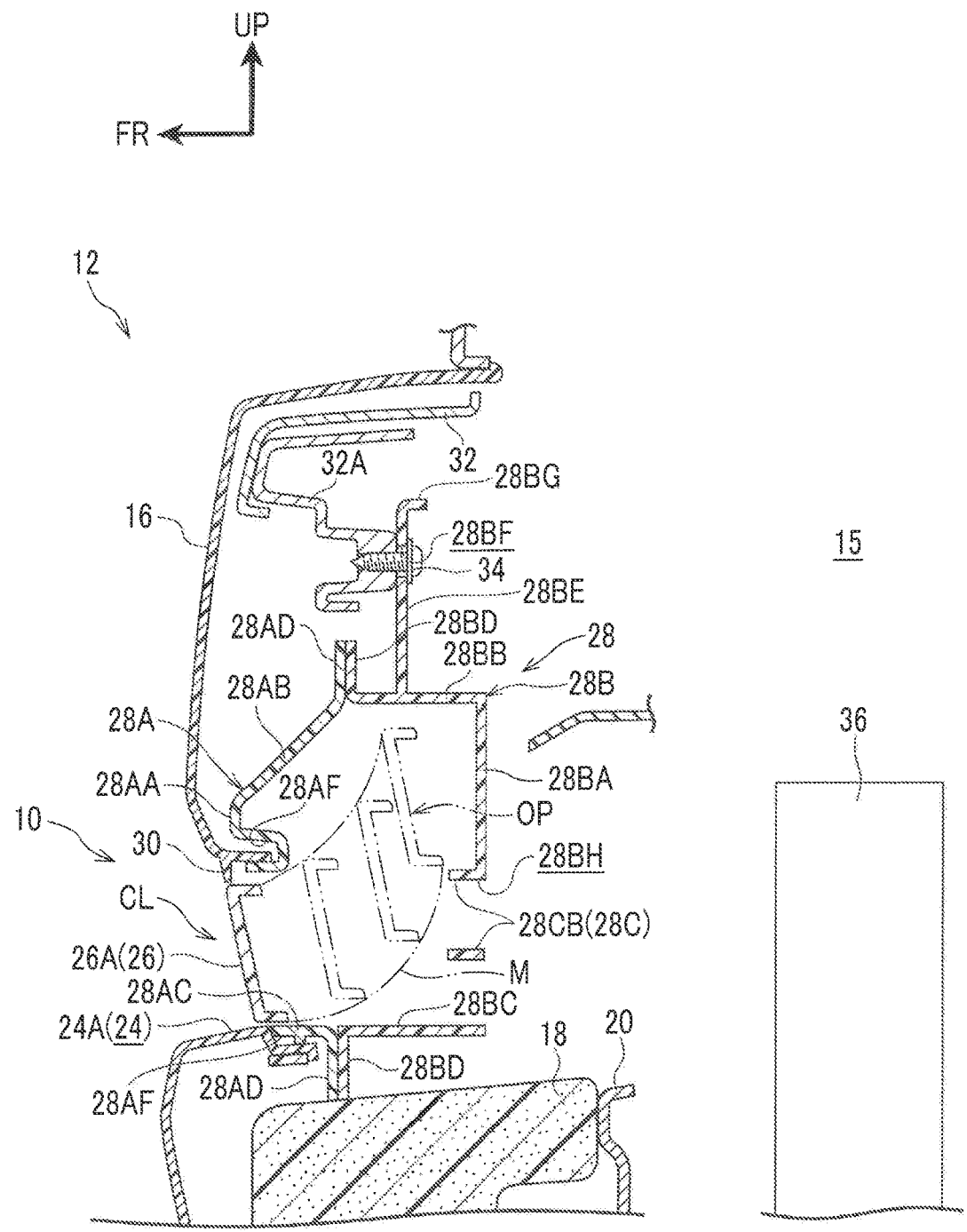
FIG. 4 is an enlarged sectional view taken along line IV-IV of FIG. 1.

The power unit room 15 illustrated in FIG. 4 is disposed on the vehicle rear side of the headlight 14. A power unit (not illustrated) and so on are disposed in the inner portion of the power unit room 15. A radiator 36 as a cooling object device for cooling the power unit is disposed on the vehicle front side of the power unit room 15.

The front bumper cover 16 is disposed on the vehicle lower side of the headlight 14. The front bumper cover 16 constitutes a part of the design surface of the vehicle body appearance and covers a front bumper absorber 18 and a front bumper reinforcement 20 (refer to FIG. 5) from the vehicle front side. The front bumper cover 16 is, for example, thinly formed of resin.

A lower grill 22 open in the vehicle front-rear direction is disposed on the vehicle lower side of the front bumper cover 16. The lower grill 22 is formed in a substantially rectangular shape that has the vehicle width direction as the longitudinal direction thereof in front view of the vehicle and is disposed such that the center of the lower grill 22 in the vehicle width direction is the same as the center of the front bumper cover 16 in the vehicle width direction.

The grill shutter device 10 is disposed between the headlight 14 and the lower grill 22. The grill shutter device 10 has an opening portion 24, a fin 26, and a frame 28 (refer to FIG. 2).

Figure 5:
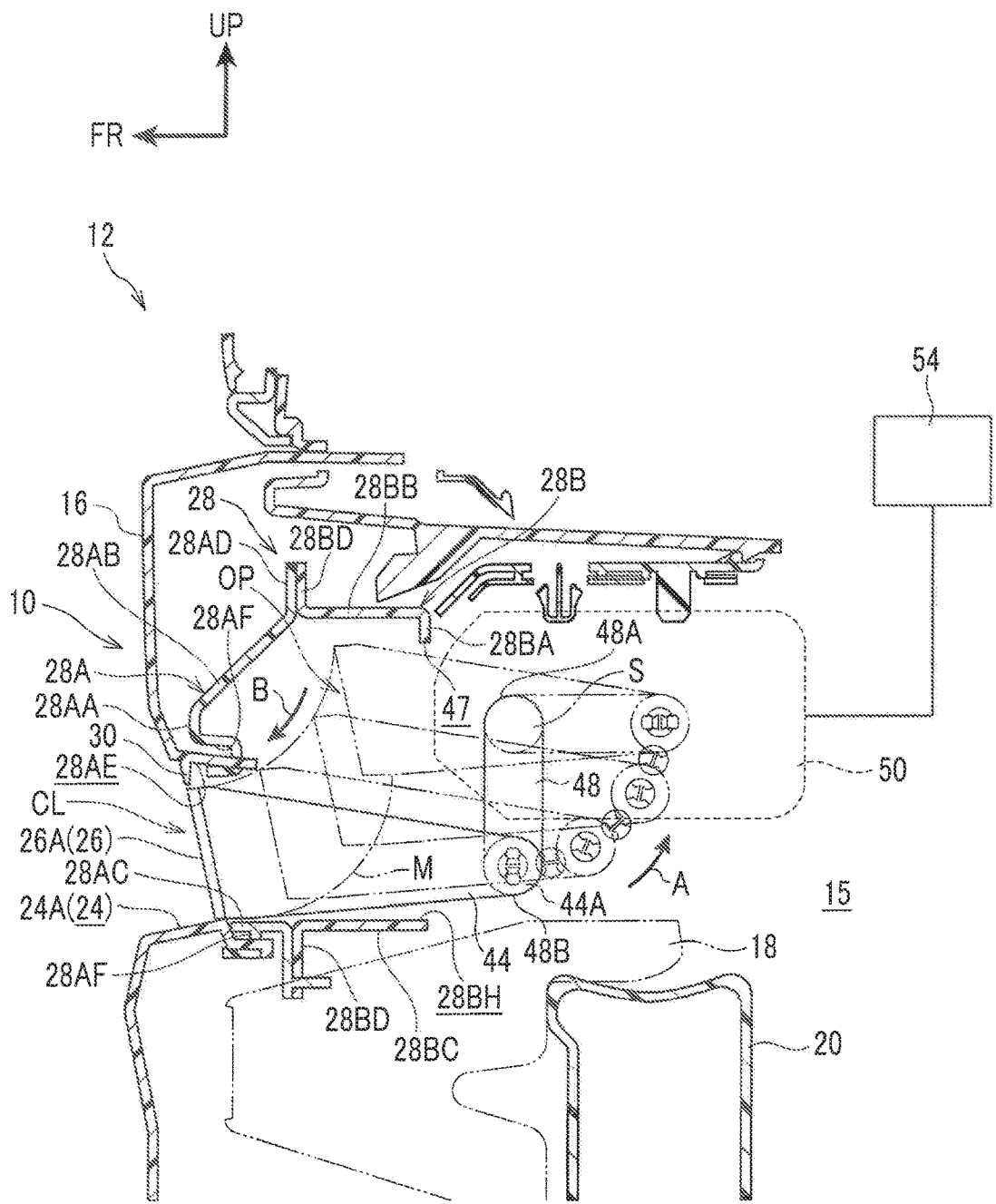
FIG. 5 is an enlarged sectional view taken along line V-V of FIG. 1.

The opening portion 24 is formed in the front bumper cover 16. The opening portion 24 is open in the vehicle front-rear direction as is the case with the lower grill 22. The opening portion 24 extends in the vehicle width direction. Specifically, the opening portion 24 is formed in a substantially rectangular shape that has the vehicle width direction as the longitudinal direction thereof in front view of the vehicle. The opening portion 24 is disposed such that the center of the opening portion 24 in the vehicle width direction is the same as the center of the front bumper cover 16 in the vehicle width direction. As illustrated in FIGS. 4 and 5, a projection portion 30 constituting a part of the design surface and protruding to the vehicle lower side is formed on an upper surface that forms a part of the opening portion 24. The projection portion 30 protrudes to be close to the upper end portion of the fin 26 that is in a closed state shown as CL in the drawings. The upper end portion of the fin 26 is set at a position of no interference with another part such as an inner frame 28B (described later) on a movement trajectory M of the fin 26.

The frame 28 is disposed on the vehicle rear side of the opening portion 24. The frame 28 has an outer frame 28A that is disposed on the vehicle front side and is formed in a substantially rectangular shape which has the vehicle width direction as the longitudinal direction thereof and the inner frame 28B that is disposed on the vehicle rear side, faces the outer frame 28A, and is formed in a substantially rectangular shape which has the vehicle width direction as the longitudinal direction thereof. The section of the inner frame 28B that is orthogonal to the longitudinal direction has a substantially hat shape open to the vehicle front side owing to a rear wall portion 28BA, an upper wall portion 28BB, a lower wall portion 28BC, and a pair of upper and lower flanges 28BD. The rear wall portion 28BA of the inner frame 28B is disposed on the vehicle rear side of the fin 26. The upper wall portion 28BB extends toward the vehicle front side from the upper end portion of the rear wall portion 28BA and is disposed on the vehicle upper side of the fin 26. The lower wall portion 28BC extends toward the vehicle front side from the lower end portion of the rear wall portion 28BA and is disposed on the vehicle lower side of the fin 26. The upper and lower flanges 28BD extend in directions away from each other along the vehicle up-down direction from the vehicle front side end portions of the upper wall portion 28BB and the lower wall portion 28BC, respectively. As a result of the above, the frame 28 is configured to cover the fin 26 in either the closed state or an open state shown as OP in the drawings from the vehicle rear side.

A fastening tab 28BE protruding toward the vehicle upper side is integrally formed substantially in the middle of the upper wall portion 28BB in the vehicle front. The fastening tab 28BE is formed in a substantially plate shape that has the vehicle front-rear direction as the plate thickness direction thereof. A fastening hole 28BF is formed in the fastening tab 28BE to penetrate the fastening tab 28BE in the plate thickness direction. The inner frame 28B, the frame 28 in the end, is fixed to the vehicle body by a fastening tool 34 being inserted into the fastening hole 28BF from the vehicle rear side and fastened to a grill inner bracket 32A attached to a grill inner 32. A flange 28BG protruding to the vehicle rear side is formed in the vehicle upper side end portion of the fastening tab 28BE. A plurality of the fastening tabs 28BE is formed in the upper wall portion 28BB. The fastening tabs 28BE are disposed at intervals in the vehicle width direction (refer to FIG. 2).

A rear side air introduction port 28BH penetrating the rear wall portion 28BA in the plate thickness direction is formed on the vehicle lower side of the rear wall portion 28BA. The rear side air introduction port 28BH is disposed on the vehicle front side of the radiator 36 disposed in the power unit room 15 and faces the radiator 36. As is the case with the opening portion 24, the rear side air introduction port 28BH is formed in a substantially rectangular shape that has the vehicle width direction as the longitudinal direction thereof in front view of the vehicle (refer to FIG. 2).

A rib 28C is disposed in the rear side air introduction port 28BH. The rib 28C is formed in a lattice shape by a plurality of vertical ribs 28CA and a plurality of lateral ribs 28CB. The vertical rib 28CA is formed in a plate shape in which the vehicle width direction is substantially the plate thickness direction thereof and extends from the upper edge of the rear side air introduction port 28BH to the lower edge of the rear side air introduction port 28BH along the vehicle up-down direction. The vertical ribs 28CA are disposed separately from each other in the vehicle width direction. For example, in the present embodiment, 10 vertical ribs 28CA are disposed and the gap between a pair of the vertical ribs 28CA disposed in the middle of the rear side air introduction port 28BH in the longitudinal direction is narrower than the gap between the other vertical ribs 28CA. The space between the vertical ribs 28CA in the middle of the rear side air introduction port 28BH in the longitudinal direction will be referred to as a communicating portion 47.

The lateral rib 28CB is formed in a plate shape in which the vehicle up-down direction is substantially the plate thickness direction thereof and extends from one side end portion of the rear side air introduction port 28BH in the vehicle width direction to the other side end portion of the rear side air introduction port 28BH in the vehicle width direction along the vehicle width direction. The lateral ribs 28CB are disposed separately from each other in the vehicle up-down direction. For example, in the present embodiment, two lateral ribs 28CB are disposed, one of the lateral ribs 28CB is formed to interconnect the upper end portions of the vertical ribs 28CA, and the other lateral rib 28CB is formed to interconnect the substantially middle portions of the vertical ribs 28CA in the vehicle up-down direction. In this configuration, the latter lateral rib 28CB is not disposed (is cut) in the communicating portion 47. As illustrated in FIG. 4, the rib 28C is formed outside the movement trajectory M between the open state and the closed state of the fin 26.

The section of the outer frame 28A that is orthogonal to the longitudinal direction has a substantially hat shape open to the vehicle rear side owing to a front wall portion 28AA, an upper wall portion 28AB, a lower wall portion 28AC, and the upper and lower flanges 28AD. The front wall portion 28AA of the outer frame 28A is disposed on the vehicle front side of the fin 26 in the open state. The upper wall portion 28AB extends from the upper end portion of the front wall portion 28AA toward the rear upper side of the vehicle and is disposed on the vehicle upper side of the fin 26. The lower wall portion 28AC extends toward the vehicle rear side from the lower end portion of the front wall portion 28AA and is disposed on the vehicle lower side of the fin 26. The upper and lower flanges 28AD extend in directions away from each other along the vehicle up-down direction from the vehicle rear side end portions of the upper wall portion 28AB and the lower wall portion 28AC, respectively.

A front side air introduction port 28AE and an opening fitting portion 28AF are formed in the front wall portion 28AA. The front side air introduction port 28AE is formed to penetrate the front wall portion 28AA in the plate thickness direction of the front wall portion 28AA and is disposed at a position corresponding to the opening portion 24. The front side air introduction port 28AE is open toward the rear side air introduction port 28BH. The front side air introduction port 28AE has the same shape as the opening portion 24 in front view of the vehicle although this is not illustrated.

The opening fitting portion 28AF is formed in each of the vehicle upper side edge portion and the vehicle lower side edge portion of the front side air introduction port 28AE and is shaped to be recessed toward the vehicle rear side. The edge portion of the opening portion 24 that extends toward the vehicle rear side is inserted and fitted in the opening fitting portion 28AF. In a state where the edge portion of the opening portion 24 is fitted in the opening fitting portion 28AF, a lower surface 24A of the opening portion 24, the lower wall portion 28AC of the outer frame 28A, and the lower wall portion 28BC of the inner frame 28B form a continuous surface in the positional relationship thereof.

The flange 28AD of the outer frame 28A and the flange 28BD of the inner frame 28B are fastened by fastening means (not illustrated) in a state of overlapping each other in the vehicle front-rear direction. As a result of the above, the frame 28 is formed in a substantially box shape that has a closed section in side view of the vehicle. The frame 28 is curved in a projecting shape in which the middle portion thereof in the longitudinal direction protrudes to the vehicle front side in plan view of the vehicle to follow the shape of the front bumper cover 16 (refer to FIG. 3A).

The fin 26 is held in the inner portion of the frame 28 to be movable between the open state and the closed state. The fin 26 is formed in a substantially rectangular plate shape that has the vehicle width direction as the longitudinal direction thereof (refer to FIG. 2). In the closed state where the opening portion 24 is closed, the fin 26 has the same shape as the front side air introduction port 28AE in front view of the vehicle (refer to FIG. 3B). A vehicle front side surface 26A of the fin 26 is formed to be a surface continuous with respect to the design surface of the front bumper cover 16. In other words, the side surface 26A of the fin 26 and another member constitute the design surface of the vehicle appearance when the fin 26 is in the closed state. Specifically, the side surface 26A of the fin 26 is disposed on substantially the same plane of the vehicle front side surfaces of the front bumper cover 16 and the projection portion 30, and thus the front bumper cover 16, the projection portion 30, and the fin 26 constitute the same continuous design surface on the vehicle front side. The above-described state of the fin 26 is an example of the "closed state" according to an aspect of the present disclosure.

Figure 2:
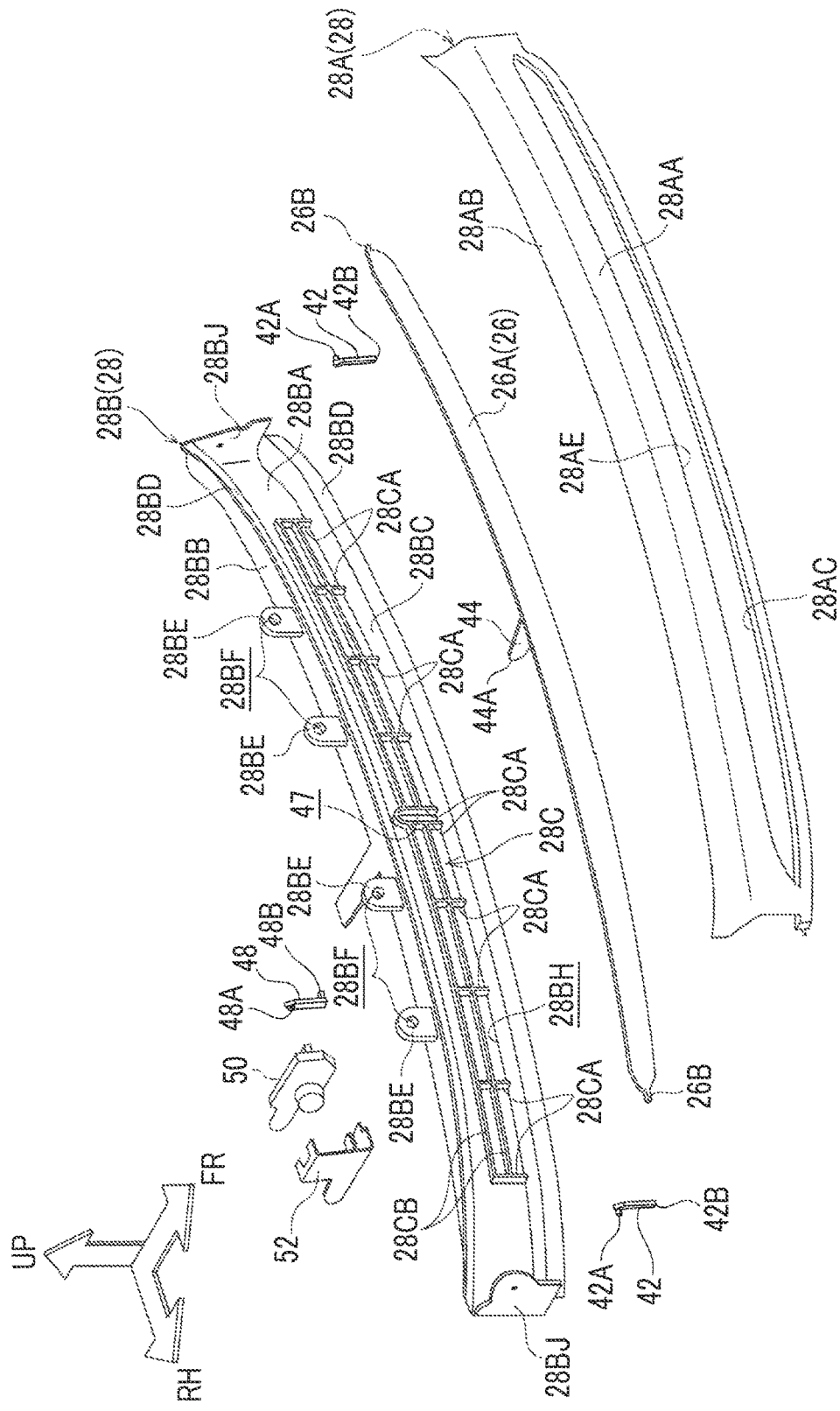
FIG. 2 is an exploded perspective view illustrating the grill shutter device according to the embodiment.

As illustrated in FIG. 2, side links 42 are respectively attached to a pair of end portions 26B of the fin 26 in the vehicle width direction. The side link 42 is formed in a substantially rectangular plate shape that has the vehicle width direction as the plate thickness direction thereof and the vehicle up-down direction as the longitudinal direction thereof. A vehicle upper side end portion 42A of the side link 42 is attached to a side wall portion 28BJ of the inner frame 28B on the vehicle width direction outside to be pivotable about the vehicle width direction as an axial direction. A vehicle lower side end portion 42B of the side link 42 is attached to the end portion 26B of the fin 26 to be pivotable about the vehicle width direction as an axial direction.

An extending portion 44 extending to the vehicle rear side is disposed in the middle of the fin 26 in the longitudinal direction. The extending portion 44 is formed in a plate shape that has the vehicle width direction as the plate thickness direction thereof. A tip portion 44A of the extending portion 44 protrudes to the vehicle rear side beyond the inner frame 28B by being inserted into the communicating portion 47 formed in the rib 28C of the inner frame 28B (refer to FIG. 5).

As illustrated in FIG. 5, a center link 48 is attached to the tip portion 44A of the extending portion 44. As is the case with the side link 42, the center link 48 is formed in a substantially rectangular plate shape that has the vehicle width direction as the plate thickness direction thereof and the vehicle up-down direction as the longitudinal direction thereof. A vehicle upper side end portion 48A of the center link 48 is attached to a rotary shaft S of an actuator 50 (described later). A vehicle lower side end portion 48B of the center link 48 is attached to the tip portion 44A of the extending portion 44 to be pivotable about the vehicle width direction as an axial direction.

The actuator 50 partially covered with an actuator cover 52 illustrated in FIG. 2 is disposed on the vehicle rear side of the inner frame 28B. The actuator 50 has the rotary shaft S rotatable about the vehicle width direction as an axial direction and is electrically connected to a controller 54. A computer provided with, for example, a known central processing unit (CPU, not illustrated), a known read only memory (ROM, not illustrated), and a known random access memory (RAM, not illustrated) mainly constitutes the controller 54. A power unit coolant temperature sensor (not illustrated) and a vehicle speed sensor (not illustrated) are connected to the input side of the controller 54. The actuator 50 is connected to the output side of the controller 54.

Action and Effect

The action and effect of the present embodiment will be described below.

As illustrated in FIG. 5, in the present embodiment, an operation signal for rotating the rotary shaft S is sent from the controller 54 to the actuator 50 in a case where the controller 54 determines that the fin 26 should be put into the open state based on the temperature of a power unit coolant or the like with the fin 26 in the closed state. The rotation direction of the rotary shaft S at this time is the direction in which the end portion 48B of the center link 48 heads for the vehicle rear side and the vehicle upper side (arrow A). As a result of the above, the fin 26 pivotably attached to the end portion 48B of the center link 48 heads for the vehicle rear side and the vehicle upper side while drawing the movement trajectory M. Following the above, the side link 42 illustrated in FIG. 2 and supporting the end portion 26B of the fin 26 also moves the end portion 42B to the vehicle rear side and the vehicle upper side about the end portion 42A. Accordingly, the entire fin 26 is smoothly moved to the vehicle rear side and the vehicle upper side. Once the lower end portion of the fin 26 subsequently moves up to substantially the same position as the vehicle upper side edge portion of the opening portion 24 in the vehicle up-down direction, the fin 26 abuts against a stopper rib (not illustrated) disposed in the inner frame 28B and a further movement is limited. The above-described state of the fin 26 is an example of the "open state" according to an aspect of the present disclosure. In contrast, when the fin 26 is put into the closed state, the rotary shaft S of the actuator 50 is rotated in the direction that is opposite to the above. Then, a movement occurs in the direction in which the end portion 48B of the center link 48 heads for the vehicle lower side and the vehicle front side (arrow B), and thus the fin 26 can be put into the closed state by being moved to the vehicle lower side and the vehicle front side.

As described above, the fin 26 is disposed in the inner portion of the opening portion 24 disposed at a part of the design surface of the vehicle front portion and on the vehicle front side of the radiator 36 mounted in the vehicle and the fin 26 opens and closes the opening portion 24 and has the same shape as the opening portion 24 in front view of the vehicle in the closed state where the opening portion 24 is closed. The fin 26 is held by the frame 28 disposed between the opening portion 24 and the radiator 36 and has the side surface 26A that is a surface continuous with respect to the design surface of the vehicle in the closed state where the opening portion 24 is closed. Accordingly, in the closed state of the fin 26, air is allowed to flow along the design surface, and thus air resistance during vehicle traveling can be reduced.

The frame 28 is configured to include the inner frame 28B covering the fin 26 from the vehicle rear side and the outer frame 28A disposed at a position facing the inner frame 28B and covering the fin 26 from the vehicle front side at least in the open state. The rear side air introduction port 28BH open toward the radiator 36 is formed in the inner frame 28B. In the outer frame 28A, the front side air introduction port 28AE open toward the rear side air introduction port 28BH is formed at a position corresponding to the opening portion 24. Accordingly, in a case where the fin 26 is in the open state during vehicle traveling, air is taken in from the opening portion 24 and flows to the radiator 36 in the power unit room 15 through the front side air introduction port 28AE of the outer frame 28A and the rear side air introduction port 28BH of the inner frame 28B. In other words, the inner frame 28B covering the fin 26 from the vehicle rear side suppresses a flow of air to the vehicle rear side from a part other than the rear side air introduction port 28BH formed in the inner frame 28B after the air passes through the opening portion 24 and the front side air introduction port 28AE, and thus the air diffusing before reaching the radiator 36 can be suppressed. As a result of the above, air can be effectively supplied to the radiator 36.

The fin 26 is held by the frame 28, and thus the frame 28 and the fin 26 are integrally configured. Accordingly, by the frame 28 being attached at a position in the vehicle that corresponds to the opening portion 24, the fin 26 also can be assembled at the same time, and thus the man-hour and cost for attachment of the grill shutter device 10 to the vehicle 12 can be suppressed. In addition, the grill shutter device 10 can be easily applied to other vehicles in which the opening portion 24 has different sizes when the shapes and the sizes of the fin 26, the front side air introduction port 28AE formed in the outer frame 28A of the frame 28, and the rear side air introduction port 28BH formed in the inner frame 28B are changed.

The opening fitting portion 28AF fitted to the edge portion of the opening portion 24 is formed in the edge portion of the front side air introduction port 28AE of the outer frame 28A, and thus the opening fitting portion 28AF can be positioned so to speak when the outer frame 28A is attached to the opening portion 24. Accordingly, the amount of deviation with respect to the position of the front side air introduction port 28AE set in advance with respect to the opening portion 24 is reduced, and thus the gap between the fin 26 and the opening portion 24 can be reduced. Appearance quality can be improved as a result of the above.

The inner frame 28B and the outer frame 28A form a closed section in side view of the vehicle, and thus air flowing in from the opening portion 24 flows to the radiator 36 from the rear side air introduction port 28BH of the inner frame 28B in a state where outward leakage of the air from the space between the inner frame 28B and the outer frame 28A is suppressed. Accordingly, air diffusing before reaching the radiator 36 after flowing in from the opening portion 24 can be further suppressed. As a result of the above, air can be further effectively supplied to the radiator 36.

The frame 28 forms a closed section in side view of the vehicle, and thus the flexural rigidity of the frame 28 itself is improved. Since the frame 28 is attached to the opening portion 24, the rigidity of the front bumper cover 16 can be improved after a decline in rigidity attributable to the formation of the opening portion 24.

The rib 28C formed in a lattice shape in front view of the vehicle is disposed in the rear side air introduction port 28BH of the inner frame 28B. Accordingly, the rib 28C formed in a lattice shape is capable of suppressing further foreign matter intrusion when foreign matter such as pebbles intrudes from the opening portion 24 with the fin 26 in the open state. Adverse effects attributable to foreign matter can be suppressed as a result of the above.

The projection portion 30 close to the vehicle upper side end portion of the fin 26 in the closed state is formed in the opening portion 24. Accordingly, the gap between the fin 26 in the closed state and the opening portion 24 can be further reduced. Appearance quality can be further improved as a result of the above.

The rear side air introduction port 28BH is disposed on the vehicle front side of the radiator 36 and faces the radiator 36. Accordingly, air flowing in from the opening portion 24 is allowed to flow more reliably to the radiator 36 via the front side air introduction port 28AE and the rear side air introduction port 28BH. Cooling performance can be further improved as a result of the above.

In the open state, the lower end portion of the fin 26 is positioned closer to the vehicle upper side than the vehicle upper side edge portion of the opening portion 24. Accordingly, air flow disturbance attributable to air coming into contact with the fin 26 in the open state after flowing into the opening portion 24 from the vehicle front can be suppressed, and thus a decline in aerodynamic performance can be suppressed even in the open state.

The fin 26 is put into the open state by being moved toward the vehicle rear side and the vehicle upper side. Accordingly, opening and closing of the opening portion 24 can be performed by the fin 26 even in a case where the fin 26 is curved along the design surface in plan view of the vehicle as illustrated in FIG. 2. In the open state, the fin 26 is unlikely to be seen from the opening portion 24 by being moved toward the vehicle rear side and the vehicle upper side, and thus the appearance design in the open state also can be improved.

In the present embodiment, the projection portion 30 is disposed to be close to the vehicle upper side end portion of the fin 26 in the closed state. However, an applicable embodiment of the present disclosure is not limited thereto. In an alternative configuration, the projection portion 30 may be disposed to be close to the vehicle lower side end portion of the fin 26 in the closed state or a plurality of the projection portions 30 may be disposed to be respectively close to both the vehicle upper side end portion and the vehicle lower side end portion of the fin 26 in the closed state.

The rib 28C has a lattice shape along each of the vehicle width direction and the vehicle up-down direction. However, an applicable embodiment of the present disclosure is not limited thereto. Alternatively, the rib 28C may have a lattice shape along another direction such as an oblique direction.

The opening fitting portion 28AF is disposed in each of the vehicle upper side edge portion and the vehicle lower side edge portion of the front side air introduction port 28AE. However, an applicable embodiment of the present disclosure is not limited thereto. In an alternative configuration, the opening fitting portion 28AF may be disposed over the entire circumference of the edge portion of the front side air introduction port 28AE or may be disposed merely at a part of the edge portion such as the vehicle upper side edge portion of the front side air introduction port 28AE.

An applicable embodiment of the present disclosure is not limited to the above-described embodiment. It is a matter of course that a gist of the present disclosure can be implemented in various modified forms other than the above-described embodiment within the gist of the present disclosure.

What is claimed is:

1. A grill shutter device comprising:

an opening portion disposed in a vehicle front portion on a vehicle front-side of a cooling object device mounted in a vehicle, the opening portion being disposed at a part of an outer surface of the vehicle front portion;

a fin configured to open and close the opening portion, the fin having the same shape as the opening portion in a front view of the vehicle and having a surface continuous with respect to the outer surface in a closed state where the fin closes the opening portion; and a frame disposed between the opening portion and the cooling object device and configured to hold the fin, the frame including an inner frame and an outer frame, the inner frame having a rear side air introduction port open toward the cooling object device, the outer frame having a front side air introduction port disposed in front of the inner frame and open toward the rear side air introduction port at a position corresponding to the opening portion, the inner frame having a first wall portion covering the fin from a vehicle rear side in an open state where the fin opens the opening portion, and the outer frame having a second wall portion covering the fin from the vehicle front side in the open state where the fin opens the opening portion.

2. The grill shutter device according to claim 1, wherein the outer frame has an opening fitting portion fitted to an edge portion of the opening portion in an edge portion of the front side air introduction port.

3. The grill shutter device according to claim 1, wherein the frame constitutes a closed section in side view of the vehicle with the inner frame and the outer frame.

4. The grill shutter device according to claim 1, wherein the inner frame has a rib formed in a lattice shape in front view of the vehicle in the rear side air introduction port.

5. The grill shutter device according to claim 1, wherein the opening portion includes a projection portion close to at least one of a vehicle upper side end portion and a vehicle lower side end portion of the fin in the closed state.

6. The grill shutter device according to claim 1, wherein the rear side air introduction port faces the cooling object device on the vehicle front side of the cooling object device.

* * * * *